United States Patent
Miura et al.

(10) Patent No.: US 12,222,105 B2
(45) Date of Patent: Feb. 11, 2025

(54) COMBUSTOR AND GAS TURBINE

(71) Applicant: Mitsubishi Power, Ltd., Yokohama (JP)

(72) Inventors: Keisuke Miura, Tokyo (JP); Katsuyoshi Tada, Tokyo (JP); Keijiro Saito, Tokyo (JP); Tomomi Koganezawa, Yokohama (JP); Mitsuhiro Karishuku, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 146 days.

(21) Appl. No.: 17/434,879

(22) PCT Filed: Jan. 24, 2020

(86) PCT No.: PCT/JP2020/002588
§ 371 (c)(1),
(2) Date: Aug. 30, 2021

(87) PCT Pub. No.: WO2020/195085
PCT Pub. Date: Oct. 1, 2020

(65) Prior Publication Data
US 2022/0163200 A1  May 26, 2022

(30) Foreign Application Priority Data
Mar. 25, 2019 (JP) .................................. 2019-057307

(51) Int. Cl.
*F23R 3/28* (2006.01)
*F23R 3/12* (2006.01)

(52) U.S. Cl.
CPC ................ *F23R 3/286* (2013.01); *F23R 3/12* (2013.01)

(58) Field of Classification Search
CPC .... F23R 3/286; F23R 3/12; F23R 3/14; F23R 3/26; F23R 3/28; F23R 2900/03045;
(Continued)

(56) References Cited

U.S. PATENT DOCUMENTS

| 3,630,024 A | 12/1971 | Hopkins |
| 8,104,284 B2 | 1/2012 | Miura et al. |

(Continued)

FOREIGN PATENT DOCUMENTS

| CN | 1401938 | 3/2003 |
| CN | 1464958 | 12/2003 |

(Continued)

OTHER PUBLICATIONS

International Search Report issued Mar. 24, 2020 in corresponding International Application No. PCT/JP2020/002588, with English translation.

(Continued)

*Primary Examiner* — Alain Chau
*Assistant Examiner* — Jingchen Liu
(74) *Attorney, Agent, or Firm* — Wenderoth, Lind & Ponack, L.L.P.

(57) ABSTRACT

A combustor includes a plurality of fuel nozzles installed so as to be extended in a direction of a nozzle axis and configured to inject fuel toward one side in the direction of the nozzle axis, a pipe plate having a plurality of air holes formed therein so as to be extended in the direction of the nozzle axis, in which the air hole has an inner diameter larger than a tip end portion of the fuel nozzle and the tip end portions are respectively inserted into the air holes, and a step surface formed at a position of the tip end portion closer to the other side in the direction of the nozzle axis than a tip (Continued)

end surface of the tip end portion so as to be expanded in a radial direction with respect to the nozzle axis from a tip end outer peripheral surface.

5 Claims, 5 Drawing Sheets

(58) Field of Classification Search
CPC ....... F05D 2240/127; F05D 2260/2212; F23D 14/62; F02C 7/22
See application file for complete search history.

(56) References Cited

U.S. PATENT DOCUMENTS

| | | | |
|---|---|---|---|
| 9,651,259 B2* | 5/2017 | Boardman | F23R 3/286 |
| 2003/0046935 A1 | 3/2003 | Halila et al. | |
| 2004/0011054 A1 | 1/2004 | Inoue et al. | |
| 2004/0229178 A1 | 11/2004 | Mandai et al. | |
| 2012/0192568 A1 | 8/2012 | Miura et al. | |
| 2013/0298561 A1 | 11/2013 | Hughes | |
| 2014/0083102 A1 | 3/2014 | Miura et al. | |
| 2014/0260299 A1 | 9/2014 | Boardman et al. | |
| 2016/0033136 A1* | 2/2016 | Kumagai | F23R 3/283 60/737 |
| 2017/0108224 A1 | 4/2017 | Beck et al. | |
| 2017/0307210 A1 | 10/2017 | Hirano et al. | |
| 2017/0328568 A1 | 11/2017 | Portillo Bilbao | |
| 2019/0107283 A1 | 4/2019 | Miyamoto et al. | |
| 2019/0277502 A1* | 9/2019 | Shershnyov | F23R 3/28 |

FOREIGN PATENT DOCUMENTS

| | | |
|---|---|---|
| CN | 103672965 | 3/2014 |
| CN | 104100975 | 10/2014 |
| CN | 108738333 | 11/2018 |
| CN | 108885002 | 11/2018 |
| EP | 1288575 | 3/2003 |
| EP | 1826485 | 8/2007 |
| JP | 2003-148734 | 5/2003 |
| JP | 2004-340416 | 12/2004 |
| JP | 2007-232234 | 9/2007 |
| JP | 2007-232325 | 9/2007 |
| JP | 2011-58775 | 3/2011 |
| JP | 4894295 | 3/2012 |
| JP | 2012/154570 | 8/2012 |
| JP | 2014-173840 | 9/2014 |
| JP | 2016-109309 | 6/2016 |
| JP | 6231769 | 11/2017 |

OTHER PUBLICATIONS

Written Opinion of the International Searching Authority issued Mar. 24, 2020 in corresponding International Application No. PCT/JP2020/002588, with English translation.

* cited by examiner

COMBUSTOR AND GAS TURBINE

TECHNICAL FIELD

The present invention relates to a combustor and a gas turbine.

Priority is claimed on Japanese Patent Application No. 2019-057307, filed Mar. 25, 2019, the content of which is incorporated herein by reference.

BACKGROUND ART

In power plants and chemical plants, to reduce the amount of carbon compounds emitted, there are increasing cases in which coal is gasified and used as fuel, or gas turbines are operated with fuel containing a large amount of hydrogen. On the other hand, it is also known that this type of fuel has a higher combustion rate than that in the related art, and thus has a higher possibility of causing flashback. Therefore, a combustor that mixes fuel and air and combusts the fuel over a shorter distance is proposed. As a specific example of such a combustor, a combustor described in Patent Document 1 is known.

The combustor described in Patent Document 1 is a so-called cluster combustor. The cluster combustor has a plurality of fuel nozzles that inject fuel and a plurality of air holes disposed on a downstream side from the fuel nozzles and provided coaxially with these nozzles. When fuel is injected, a mixed gas of ambient air and the fuel is supplied to a downstream side through the air holes. By igniting the mixed gas, a plurality of small flames are formed on a downstream side from the air holes. Further, a protrusion for disturbing a flow is provided on an outer peripheral surface of a tip end portion of the fuel nozzle. The mixing of fuel and air is promoted by disturbing a flow.

CITATION LIST

Patent Document

Patent Document 1: Japanese Patent No. 4894295

SUMMARY OF INVENTION

Technical Problem

In the device described in Patent Document 1, since the protrusion for causing the disturbing is provided at the tip end portion of the fuel nozzle, the mixed gas may stay in the vicinity of the tip end portion. When the mixed gas stays, if a flame on a downstream side propagates to an upstream side, or an ignition source flies from the upstream side and reach the mixed gas for some reason, a flame may be formed (held) in an unexpected region. That is, the device described in Patent Document 1 may cause flashback.

The present invention is made to solve the above problems, and an object of the present invention is to provide a combustor and a gas turbine that promote the mixing of fuel and air and further reduce a possibility of causing flashback.

Solution to Problem

According to an aspect of the present invention, a combustor includes a plurality of fuel nozzles which are installed so as to be extended in a direction of a nozzle axis and each of which is configured to inject fuel toward one side in the direction of the nozzle axis, a pipe plate having a plurality of air holes which are formed in the pipe plate so as to be extended in the direction of the nozzle axis, in which the air holes each has an inner diameter larger than a tip end portion of a corresponding one of the fuel nozzles, and the tip end portions of the fuel nozzles are respectively inserted into the air holes, and a step surface which is formed at a position of the tip end portion of the fuel nozzle closer to the other side in the direction of the nozzle axis than a tip end surface of the tip end portion facing the one side in the direction of the nozzle axis so as to be expanded in a radial direction of the fuel nozzle with respect to the nozzle axis from a tip end outer peripheral surface that is an outer peripheral surface of the tip end portion.

According to the above configuration, the tip end portion of the fuel nozzle is inserted into the air hole, and the step surface that expands in the radial direction from the outer peripheral surface (the tip end outer peripheral surface) of the tip end portion is formed at a position closer to the other side than the tip end surface of the tip end portion. As a result, a flow of air forms a circulating flow region and a turbulent flow region on a downstream side from the step surface. The mixing of the fuel and the air can be promoted by the turbulent flow reaching a tip end of the fuel nozzle. In particular, since the step surface is formed at the tip end portion inserted into the air hole in which a flow velocity of the air becomes high, strong air disturbing occurs on the downstream side from the step surface. As a result, the mixing of the fuel and the air can be further promoted. In addition, since the step surface is provided at a position closer to the other side than the tip end surface of the fuel nozzle, the circulating flow caused by the step surface does not reach the tip end of the fuel nozzle. Therefore, a possibility of the mixed gas containing the fuel being captured in the circulating flow is reduced, and flashback can be suppressed.

In the combustor, a region of the tip end outer peripheral surface on the one side in the direction of the nozzle axis from the step surface may be formed so as to be extended from an outer side toward an inner side in the radial direction with respect to the nozzle axis as it goes from the other side toward the one side.

According to the above configuration, the region of the tip end outer peripheral surface on the one side from the step surface extends from the outer side to the inner side in the radial direction as it goes from the other side toward the one side to form a taper shape. Accordingly, a flow toward the center of the fuel nozzle (that is, toward the nozzle axis) along this region is formed. As a result, the magnitude of the circulating flow formed along the tip end outer peripheral surface is reduced, and flame holding in the vicinity of the tip end surface can be suppressed. Further, since the turbulent flow component generated by the step surface also goes toward the center of the fuel nozzle (that is, toward the nozzle axis), the turbulent flow component is supplied to an interface between the fuel and the air. As a result, the mixing of the fuel and the air can also be further promoted.

In the combustor, when a dimension, in the direction of the nozzle axis, of a region of the tip end outer peripheral surface on the one side in the direction of the nozzle axis from the step surface is x and a dimension of the step surface in the radial direction is s, the combustor may be satisfied a first condition of 5<x/s<20.

According to the above configuration, the circulating flow formed on the downstream side from the step surface can be reattached to the tip end outer peripheral surface. In other words, according to the above configuration, the circulating flow can be formed stably on the downstream side from the step surface.

The combustor may further include a plurality of disturbing chips which are formed on the tip end outer peripheral surface at intervals in a circumferential direction with respect to the nozzle axis so as to be protruded in the radial direction from the tip end outer peripheral surface, in which the step surfaces are formed on the disturbing chips.

According to the above configuration, the plurality of disturbing chips protruding in the radial direction from the tip end outer peripheral surface are arranged at intervals in the circumferential direction. Accordingly, an air leak flow occurs through the interval between the disturbing chips. As a result, the leak flow interferes with the circulating flow formed on the downstream side from the step surface, and the magnitude of the circulating flow can be reduced. Therefore, a possibility of flashback caused by the circulating flow being excessive can be further reduced.

In the combustor, when a dimension, in the direction of the nozzle axis, of a region of the tip end outer peripheral surface on the one side in the direction of the nozzle axis from the step surface is x and a dimension of the step surface in the radial direction is s, the combustor may be satisfied a second condition of $2 < x/s < 8$.

According to the above configuration, the circulating flow formed on the downstream side from the step surface can be reattached to the tip end outer peripheral surface. In other words, according to the above configuration, the circulating flow can be formed stably on the downstream side from the step surface.

According to another aspect of the present invention, a gas turbine includes a compressor which is configured to generate compressed air, the combustor according to any one of the above aspects, which is configured to generate a combustion gas by mixing fuel with the compressed air and combusting the fuel, and a turbine which is driven by the combustion gas.

According to the above configuration, it is possible to provide a gas turbine capable of operating more stably.

Advantageous Effects of Invention

According to the present invention, it is possible to provide a combustor and a gas turbine that promote the mixing of fuel and air and further reduce a possibility of causing flashback.

DESCRIPTION OF EMBODIMENTS (First Embodiment)

Figure 7:
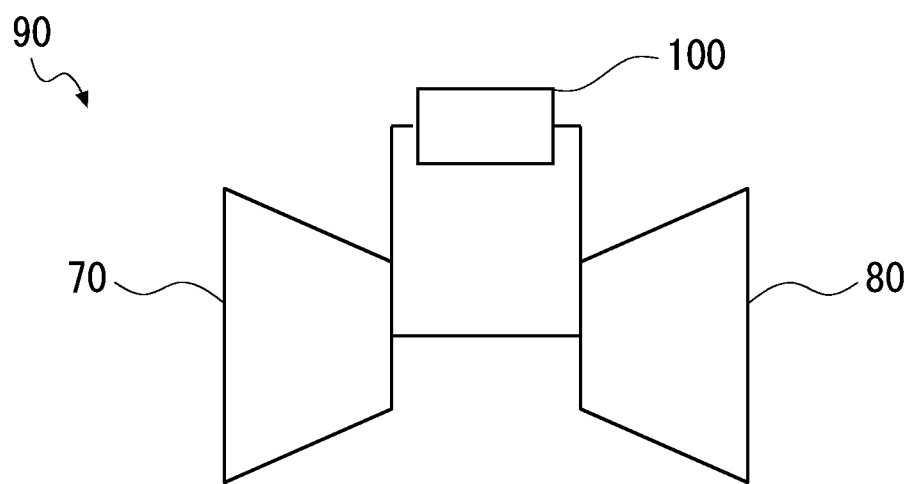
FIG. 7 is a schematic view showing a configuration of a gas turbine according to each embodiment of the present invention.

A first embodiment of the present invention will be described with reference to FIGS. 1 to 4 and 7. As shown in FIG. 7, a combustor 100 according to the present embodiment is, for example, an apparatus used as an element of a gas turbine. A gas turbine 90 includes a compressor 70 that generates compressed air, the combustor 100 that generates combustion gas, and a turbine 80 which is driven by the combustion gas. The combustor 100 mixes fuel with air (compressed air) taken in from the outside and combusts the fuel to generate high-temperature and high-pressure combustion gas.

Figure 1:
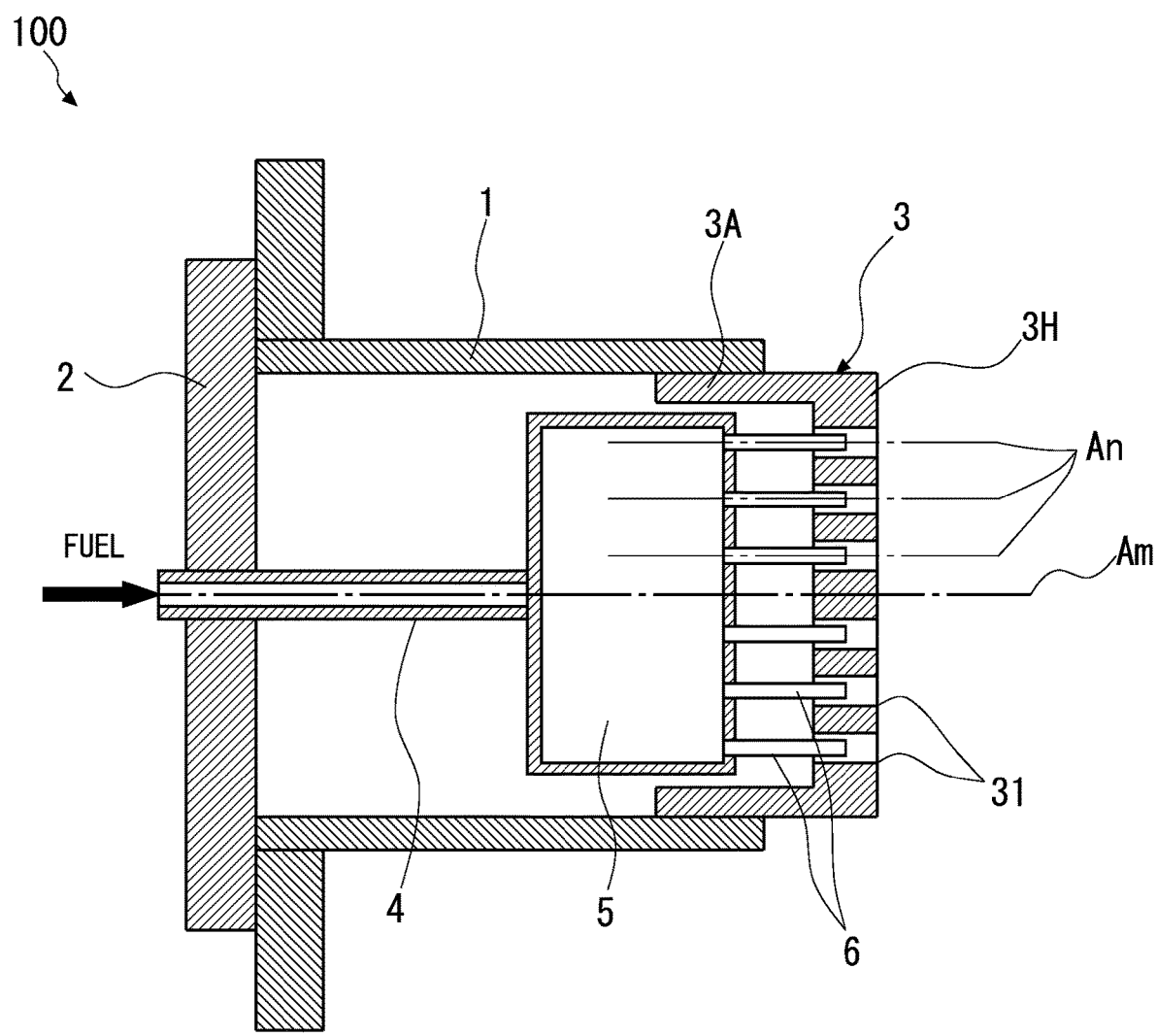
FIG. 1 is an overall view showing a configuration of a combustor according to a first embodiment of the present invention.

As shown in FIG. 1, the combustor 100 includes a tube body 1, a closing plate 2, a pipe plate 3, a fuel supply pipe 4, a plenum 5, and fuel nozzles 6. The tube body 1 has a cylindrical shape centered on a main axis Am. The pipe plate 3 has a disk shape, and is attached to one side of the tube body 1 in a direction of the main axis Am. Specifically, the pipe plate 3 has a pipe plate main body 3H in which a plurality of air holes 31, which will be described later, are formed, and a tubular fitting portion 3A extending in the direction of the main axis Am from an outer peripheral edge of the pipe plate main body 3H. The fitting portion 3A is fitted to an inner peripheral surface of the tube body 1, whereby the pipe plate 3 is fixed to the tube body 1. An end portion of the tube body 1 on the other side in the direction of the main axis Am is closed by the closing plate 2.

The fuel supply pipe 4, the plenum 5, and the fuel nozzles 6 are housed inside the tube body 1. The fuel supply pipe 4 penetrates the closing plate 2 in the direction of the main axis Am. The fuel is supplied from the outside through the fuel supply pipe 4. The plenum 5 is attached to an end portion of the fuel supply pipe 4 on the one side. The plurality of fuel nozzles 6 are provided in an end surface of the plenum 5 on the one side. Each fuel nozzle 6 extends in a nozzle axis An parallel to the main axis Am. The air holes 31 are formed in the pipe plate 3 at positions corresponding to the fuel nozzles 6. The air hole 31 penetrates the pipe plate 3 in a direction of the nozzle axis An. That is, the fuel nozzle 6 and the air hole 31 are disposed to be coaxial on the nozzle axis An. An inner diameter of each of the air holes 31 is larger than an outer diameter of the corresponding one of the fuel nozzles 6.

Figure 2:
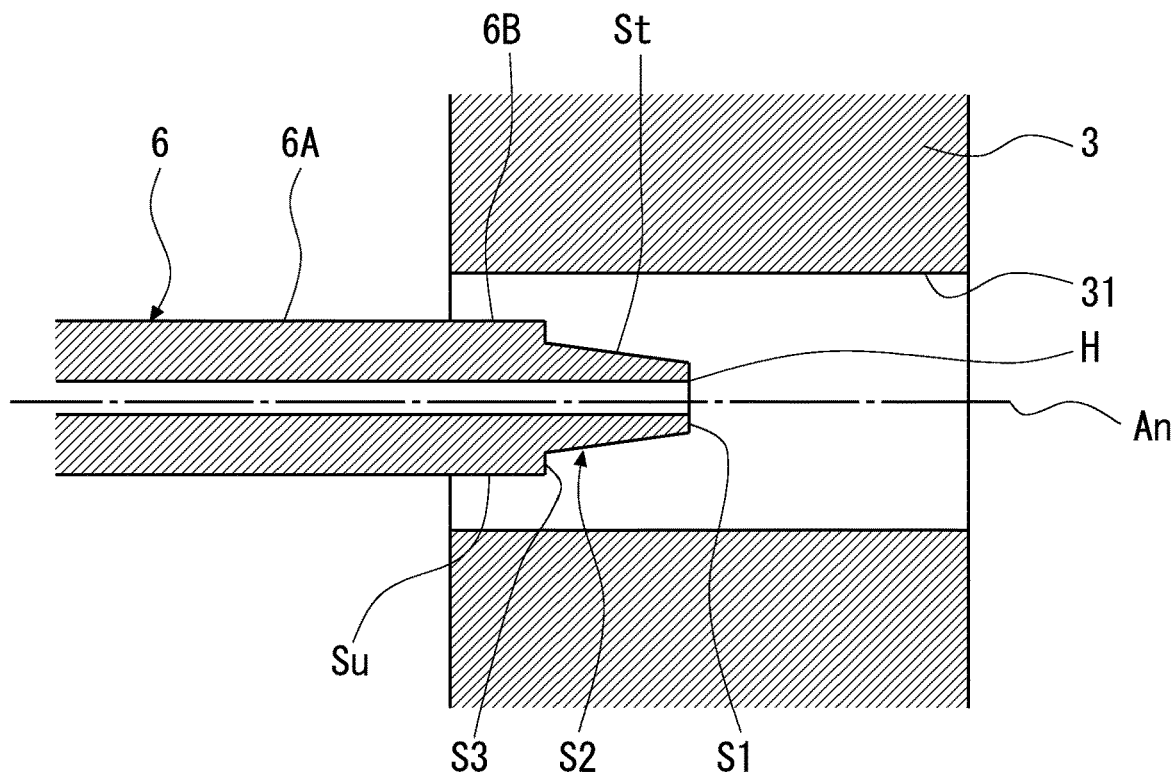
FIG. 2 is an enlarged cross-sectional view of a main part of the combustor according to the first embodiment of the present invention.

Next, a configuration of the fuel nozzle 6 will be described with reference to FIG. 2. As shown in FIG. 2, the fuel nozzle 6 has a body portion 6A located outside the air hole 31 and a tip end portion 6B inserted into the air hole 31. A surface of the tip end portion 6B facing one side in the direction of the nozzle axis An is a tip end surface S1. An injection hole H for injecting the fuel is formed in the tip end surface S1. An outer peripheral surface of the tip end portion 6B is a tip end outer peripheral surface S2. A region of the tip end outer peripheral surface S2 closest to the one side in the direction of the nozzle axis An is a tapered surface St. The tapered surface St extends from an outer side toward an inner side in a radial direction as it goes from the other side toward the one side in the direction of the nozzle axis An.

An edge of the tapered surface St on the other side is connected to a step surface S3. The step surface S3 has an annular shape expanding in the radial direction from the tip end outer peripheral surface S2 (the tapered surface St). More specifically, in the present embodiment, the step surface S3 expands in a plane orthogonal to the nozzle axis An. That is, a step is formed on the tip end portion 6B by the step surface S3. An outer edge of the step surface S3 in the radial direction is connected to an upstream side outer peripheral surface Su. The upstream side outer peripheral surface Su has a constant diameter over the entire extending direction thereof and is connected to an outer peripheral surface of the body portion 6A.

Figure 3:
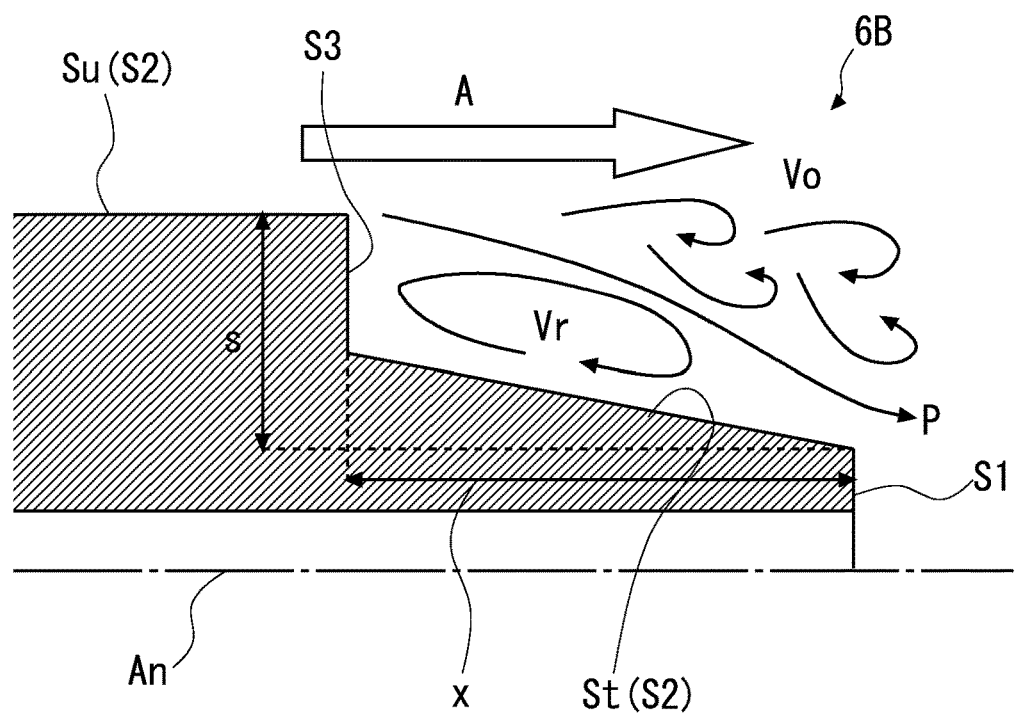
FIG. 3 is an explanatory diagram illustrating a flow of a fluid around a fuel nozzle according to the first embodiment of the present invention.

Further, as shown in FIG. 3, when a dimension, in the direction of the nozzle axis An, of a region (that is, the tapered surface St) of the tip end outer peripheral surface S2 on the one side from the step surface S3 is x and a dimension of the step surface S3 in the radial direction (that is, a dimension of the step surface S3 in the radial direction with the innermost edge of the tapered surface St in the radial direction as a reference) is s, a value of x/s may satisfy the relationship of the following expression (1).

$$5 < x/s < 20 \quad (1)$$

Further, it is desirable that the value of x/s satisfy the relationship of the following expression (2).

$$8 < x/s < 16 \quad (2)$$

Further, it is most desirable the value of x/s satisfy the relationship of the following expression (3).

$$8 < x/s < 10 \quad (3)$$

Subsequently, an operation of the combustor 100 and behavior of a fluid around the fuel nozzle 6 according to the present embodiment will be described. In operating the combustor 100, as shown in FIG. 1, first, the fuel is supplied into the plenum 5 from the outside through the fuel supply pipe 4. At this time, high-pressure air is supplied to the inside of the tube body 1. The fuel is supplied to the fuel nozzles 6 via the plenum 5. As described above, the tip end portion 6B of the fuel nozzle 6 is inserted into the air hole 31, and a gap is formed between the outer peripheral surface of the tip end portion 6B and an inner peripheral surface of the air hole 31. Therefore, when the fuel is injected from the injection hole H of the fuel nozzle 6, the high-pressure air flows from the inside of the tube body 1 into the air hole 31 through the gap. Therefore, the fuel and the air are mixed in the air hole 31 to generate a mixed gas. By igniting the mixed gas, a flame is formed on a downstream side (the one side in the direction of the nozzle axis An) of each air hole 31.

Here, as shown in FIG. 3, around the tip end portion 6B of the fuel nozzle 6, an air flow A forms a turbulent flow Vo and a circulating flow Vr after passing through the step surface S3. Specifically, the air flow A flowing along the upstream side outer peripheral surface Su is separated from the tip end outer peripheral surface S2 when reaching the step surface S3 and forms the turbulent flow Vo containing a vortex on a downstream side from the step surface S3. On the other hand, in a region along the step surface S3 and the tapered surface St, the residual component of the air flow A stays to form the circulating flow Vr.

The mixing of the fuel and the air can be promoted by the turbulent flow Vo reaching a tip end (the tip end surface S1) of the fuel nozzle 6. In particular, since the step surface S3 is formed at the tip end portion 6B inserted into the air hole 31, air having a higher flow velocity passes around the step surface S3. As a result, strength of the turbulent flow Vo is increased, and the mixing of the fuel and the air can be further promoted. In addition, since the step surface S3 is provided at a position of the fuel nozzle 6 closer to the other side (the upstream side) than the tip end surface S1, the circulating flow Vr caused by the step surface S3 does not reach the tip end (the tip end surface S1) of the fuel nozzle 6. Therefore, a possibility of the mixed gas containing the fuel being captured in the circulating flow Vr is reduced, and flashback can be suppressed. As described above, in the combustor 100 according to the present embodiment, a possibility of flashback can be further reduced while promoting the mixing of the fuel and the air.

Further, according to the above configuration, the region of the tip end outer peripheral surface S2 on the one side from the step surface S3 extends from the outer side to the inner side in the radial direction as it goes from the other side toward the one side to form the tapered surface St. Accordingly, a flow toward the center of the fuel nozzle 6 (that is, toward the nozzle axis An) along the tapered surface St is formed. As a result, the magnitude of the circulating flow Vr formed along the tip end outer peripheral surface S2 is reduced, and flame holding in the vicinity of the tip end surface S1 can be suppressed. Further, since the turbulent flow Vo generated by the step surface S3 also goes toward the center of the fuel nozzle 6 (that is, toward the nozzle axis An), a component containing the turbulent flow Vo is supplied to an interface P between the fuel and the air. As a result, the mixing of the fuel and the air can also be further promoted.

In addition, in the above combustor, when a dimension, in the direction of the nozzle axis An, of the region of the tip end outer peripheral surface S2 on the one side in the direction of the nozzle axis An from the step surface S3 is x and a dimension of the step surface S3 in the radial direction is s, the combustor is satisfied a condition of 5<x/s<20. According to this configuration, the circulating flow Vr formed on the downstream side from the step surface S3 can be reattached to the tip end outer peripheral surface S2. In other words, according to the above configuration, the circulating flow Vr can be formed more stably on the downstream side from the step surface S3.

Figure 4:
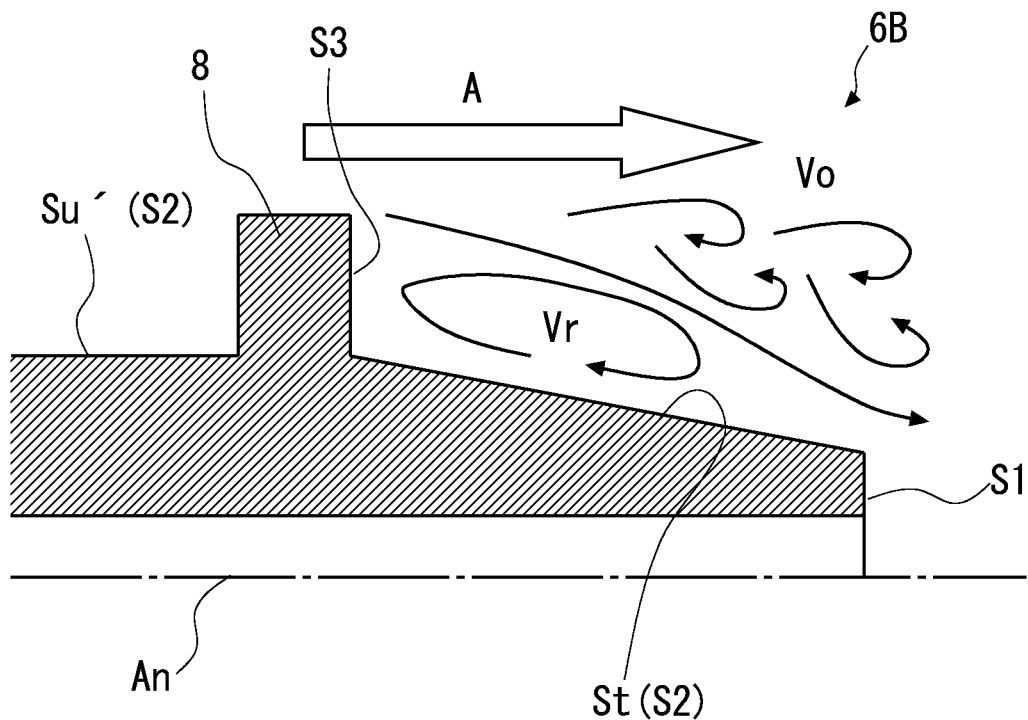
FIG. 4 is a diagram showing a fuel nozzle according to a modification example of the first embodiment of the present invention.

The first embodiment of the present invention has been described above. It is possible to make various changes and modifications to the above configuration without departing from the spirit of the present invention. For example, as shown in FIG. 4, an annular rib 8 centered on the nozzle axis An may be provided on the tip end outer peripheral surface S2, and a surface of the rib 8 facing the one side in the direction of the nozzle axis An may be the step surface S3. That is, in this configuration, an upstream side outer peripheral surface Su' on the other side from the rib 8 and an edge of the tapered surface St on the other side are provided at the same position in the radial direction with respect to the nozzle axis An. Even with this configuration, the same effects as those described above can be obtained.

(Second Embodiment)

Figure 5:
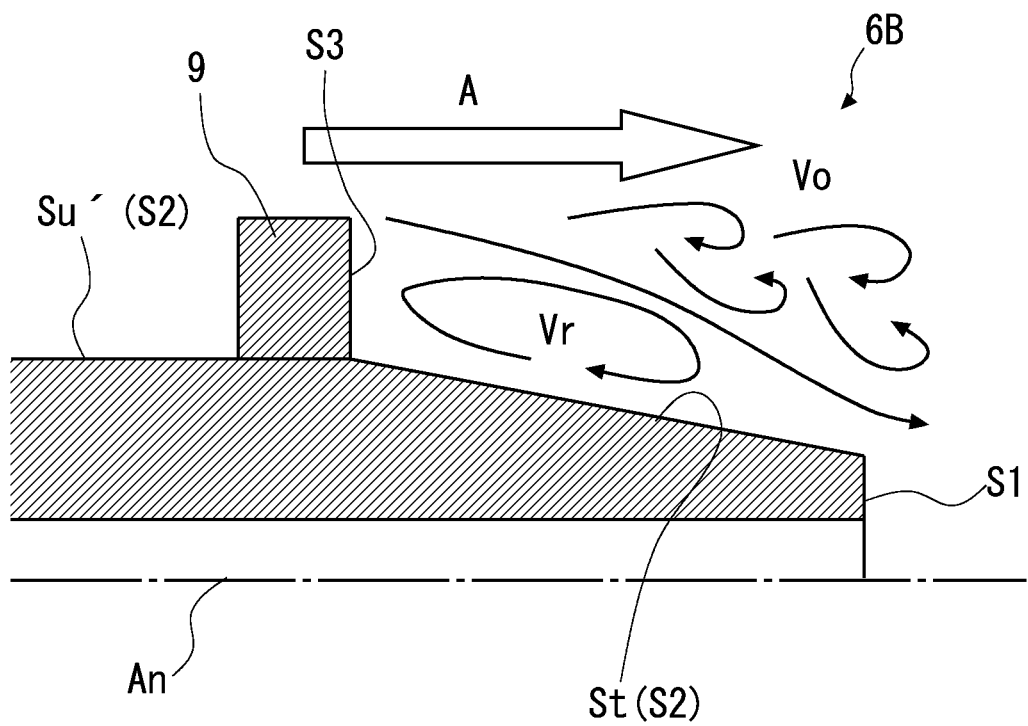
FIG. 5 is an enlarged cross-sectional view of a main part of a combustor according to a second embodiment of the present invention.
Figure 6:
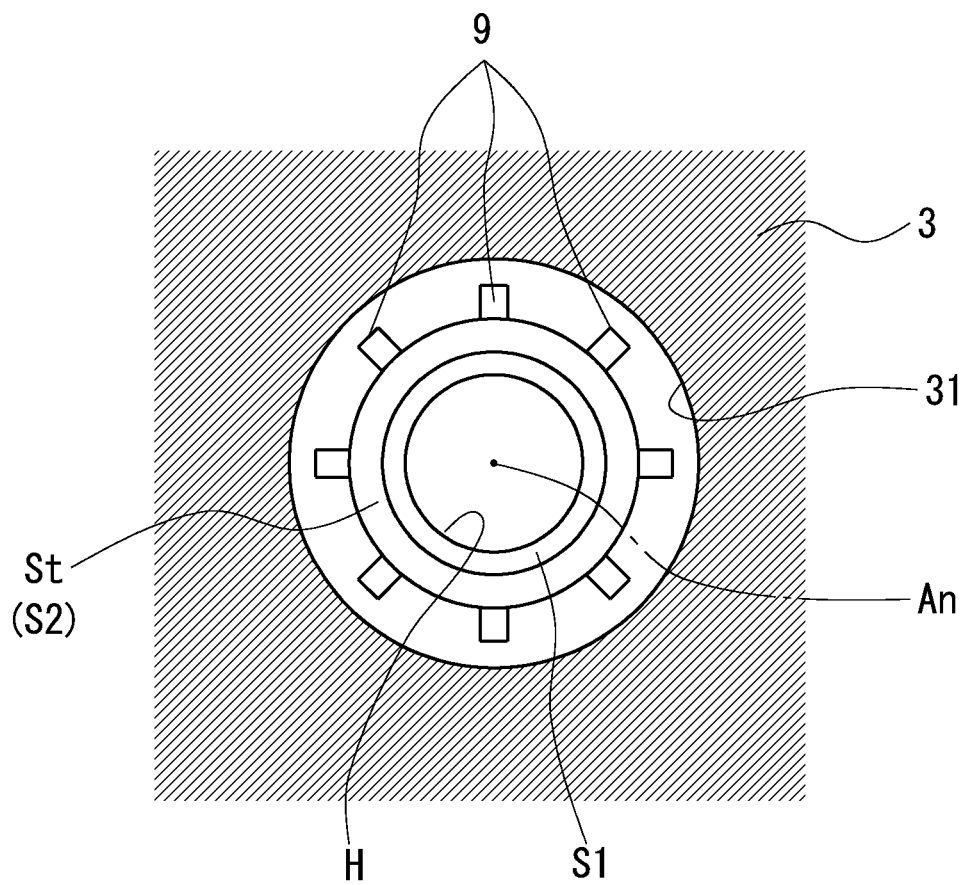
FIG. 6 is a view of the combustor of FIG. 5 in a direction of a nozzle axis.

Next, a second embodiment of the present invention will be described with reference to FIGS. 5 and 6. The same components as those in the first embodiment are designated by the same reference signs, and detailed description thereof will be omitted. As shown in FIGS. 5 and 6, in the present embodiment, a plurality (8 pieces as an example) of disturbing chips 9 are formed on the tip end outer peripheral surface S2 at intervals in the circumferential direction so as to be protruded in the radial direction from the tip end outer peripheral surface S2. A surface of each disturbing chip 9 facing the one side in the direction of the nozzle axis An is the step surface S3. The step surface S3 expands in the radial direction with respect to the nozzle axis An. Further, each disturbing chip 9 has a rectangular cross-sectional shape in a cross-sectional view including the nozzle axis An.

Further, in the present embodiment, the value of x/s described in the first embodiment satisfies the relationship of the following expression (4).

$$2 < x/s < 8 \quad (4)$$

It is even desirable that the value of x/s satisfy the relationship of the following expression (5).

$$3 < x/s < 7 \quad (5)$$

It is most desirable that the value of x/s satisfy the relationship of the following expression (6).

$$4 < x/s < 6 \quad (6)$$

According to the above configuration, the plurality of disturbing chips 9 protruding in the radial direction from the tip end outer peripheral surface S2 are arranged at intervals in the circumferential direction. Accordingly, an air leak flow occurs through the interval between the disturbing chips 9. As a result, the leak flow interferes with the circulating flow Vr formed on the downstream side from the step surface S3, and the magnitude of the circulating flow Vr can be reduced. Therefore, a possibility of flashback caused by the circulating flow Vr being excessive can be further reduced.

Further, in the above configuration, when a dimension, in the direction of the nozzle axis An, of the region of the tip end outer peripheral surface S2 on the one side in the direction of the nozzle axis An from the step surface S3 is x and a dimension of the step surface in the radial direction is s, the combustor is satisfied a condition of $2 < x/s < 8$. Accordingly, the circulating flow Vr formed on the downstream side from the step surface S3 can be reattached to the tip end outer peripheral surface S2. In other words, according to the above configuration, the circulating flow Vr can be formed more stably on the downstream side from the step surface S3.

Figure 8:
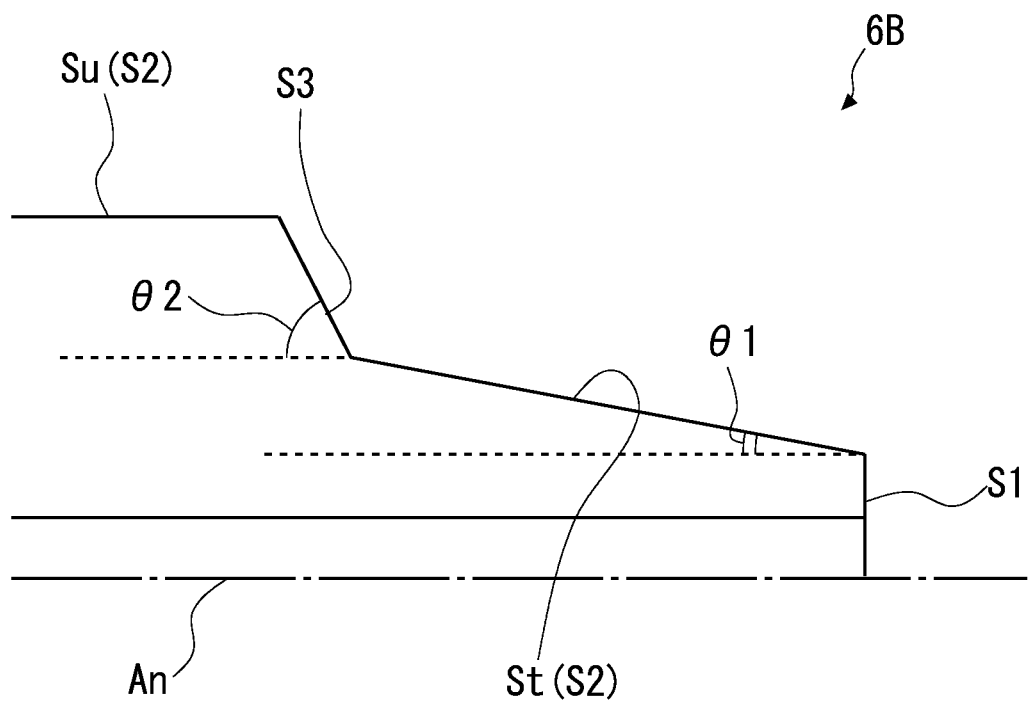
FIG. 8 is an enlarged view of a main part of a combustor according to a modification example of the present invention.

The second embodiment of the present invention has been described above. It is possible to make various changes and modifications to the above configuration without departing from the spirit of the present invention. For example, as a modification example common to each of the above embodiments, the configuration shown in FIG. 8 can be employed. In each of the above embodiments, an example in which the step surface S3 expands in a plane orthogonal to the nozzle axis An has been described, but in an example of FIG. 8, a step surface S3' is conical surface forming an angle θ2, which is smaller than 90°, with respect to the nozzle axis An. Further, the angle θ2 is larger than an angle θ1 which is formed by the tapered surface St with respect to the axis An. Even with this configuration, the same effects as those of the above-described embodiments can be obtained.

INDUSTRIAL APPLICABILITY

According to the present invention, it is possible to provide a combustor and a gas turbine that promote the mixing of fuel and air and further reduce a possibility of causing flashback.

REFERENCE SIGNS LIST

100 Combustor
1 Tube body
2 Closing plate
3 Pipe plate
3A Fitting portion
3H Pipe plate main body
31 Air hole
4 Fuel supply pipe
5 Plenum
6 Fuel nozzle
6A Body portion
6B Tip end portion
8 Rib
9 Disturbing chip
70 Compressor
80 Turbine
90 Gas turbine
Am Main axis
An Nozzle axis
H Injection hole
P Interface
S1 Tip end surface
S2 Tip end outer peripheral surface
S3 Step surface
St Tapered surface
Su, Su' Upstream side outer peripheral surface
Vo Turbulent flow
Vr Circulating flow

The invention claimed is:

1. A combustor comprising:
a plurality of fuel nozzles which are parallel to each other, wherein each of the plurality of fuel nozzles has a respective center nozzle axis, and
each of the plurality of fuel nozzles is configured to inject fuel in a direction of the respective center nozzle axis; and
a pipe plate having a plurality of air holes that are formed in the pipe plate, wherein a respective tip end portion of each of the plurality of fuel nozzles is inserted into a respective air hole of the plurality of air holes, and the respective air hole of the plurality of air holes has an inner diameter, and the respective tip end portion of each of the plurality of fuel nozzles is extended in the direction of the respective center nozzle axis,
wherein the respective tip end portion of each of the plurality of fuel nozzles has
a tip end surface formed at a first side and the fuel is injected from an opening at the tip end surface,
a single step surface formed at a second side that is opposite to the first side relative to the direction of the respective center nozzle axis,
a tapered tip end outer peripheral surface connecting the tip end surface and the single step surface, the single step surface extending outwardly from the tapered tip end outer peripheral surface to a radial outer edge in a radial direction relative to the direction of the respective center nozzle axis, and
an upstream side outer peripheral surface connected to the radial outer edge of the single step surface,
wherein, for the respective tip end portion of each of the plurality of fuel nozzles, the single step surface is located inside the respective air hole,
wherein, for the respective tip end portion of each of the plurality of fuel nozzles, an outer diameter of the tip end surface is smaller than an outer diameter of the single step surface and the inner diameter of the respective air hole of the plurality of air holes, and
wherein, around the respective tip end portion of each of the plurality of fuel nozzles, an air flow is introduced into the respective air hole of the plurality of air holes along the upstream side outer peripheral surface of the respective tip end portion of each of the plurality of fuel nozzles.

2. The combustor according to claim 1, wherein, for the respective tip end portion of each of the plurality of fuel nozzles, a region of the tapered tip end outer peripheral surface between the single step surface and the tip end surface is formed so as to be extended radially inward in the radial direction relative to the respective center nozzle axis from the single step surface toward the tip end surface.

3. The combustor according to claim 1, wherein, for the respective tip end portion of each of the plurality of fuel nozzles, when an axial length of a region of the tapered tip end outer peripheral surface, which is an outer peripheral surface between the single step surface and the tip end surface, is x and a radial width between the radial outer edge of the single step surface and an radial outer edge of the tip end surface in the radial direction relative to the respective center nozzle axis is s, a first condition of $5<x/s<20$ is satisfied.

4. A gas turbine comprising: a compressor which is configured to generate compressed air; the combustor according to claim 1, which is configured to generate a combustion gas by combusting a mixture of the fuel and the compressed gas; and a turbine which is driven by the combustion gas.

5. A combustor configured to generate a combustion gas by combusting a mixture of a fuel and a compressed gas, the combustor comprising:
  a plurality of fuel nozzles extending in parallel to each other, wherein each of the plurality of fuel nozzles is configured to inject fuel toward a first side in a direction of a respective axis of each of the plurality of fuel nozzles; and
  a pipe plate having a plurality of air holes that are formed in the pipe plate, wherein a respective tip end portion of each of the plurality of fuel nozzles is inserted into a respective air hole of the plurality of air holes, and the respective tip end portion of each of the plurality of fuel nozzles has
    a tip end surface formed at a first side of the respective tip end portion and the fuel is injected from an opening at the tip end surface,
    a single step surface formed at a second side of the respective tip end portion and having an annular shape that is expanded from a tip end outer peripheral surface to a radial outer edge in a radial direction relative to the direction of the respective axis, and
    an upstream side outer peripheral surface connected to the radial outer edge of the single step surface, wherein the tip end surface faces the first side in the direction of the respective axis,
  wherein the respective air hole of the plurality of air holes has an inner diameter that is larger than an outer diameter of the tip end surface of the respective tip end portion of each of the plurality of fuel nozzles, the respective air hole of the plurality of air holes being extended in the direction of the respective axis of each of the plurality of fuel nozzles,
  wherein, for the respective tip end portion of each of the plurality of fuel nozzles, the annular shape of the single step surface is centered on the respective nozzle-axis of each of the plurality of fuel nozzles,
  wherein, for the respective tip end portion of each of the plurality of fuel nozzles, the single step surface is located inside the respective air hole,
  wherein, for the respective tip end portion of each of the plurality of fuel nozzles, the outer diameter of the tip end surface is smaller than an outer diameter of the tip end outer peripheral surface at the single step surface, and
  wherein, around the respective tip end portion of each of the plurality of fuel nozzles, an air flow is introduced into the respective air hole of the plurality of air holes along the upstream side outer peripheral surface of the respective tip end portion of each of the plurality of fuel nozzles.

* * * * *